US009825479B2

(12) United States Patent
Kim et al.

(10) Patent No.: US 9,825,479 B2
(45) Date of Patent: Nov. 21, 2017

(54) METHOD, DEVICE, AND SYSTEM FOR CONTROLLING CHARGING AND DISCHARGING OF ENERGY STORAGE APPARATUS

(71) Applicant: KT CORPORATION, Seongnam (KR)

(72) Inventors: Min-Gyung Kim, Pyeongtak-si (KR); Min-Jin Lee, Seoul (KR)

(73) Assignee: KT Corporation, Seongnam (KR)

( * ) Notice: Subject to any disclaimer, the term of this patent is extended or adjusted under 35 U.S.C. 154(b) by 1064 days.

(21) Appl. No.: 13/716,344

(22) Filed: Dec. 17, 2012

(65) Prior Publication Data

US 2013/0162037 A1   Jun. 27, 2013

(30) Foreign Application Priority Data

Dec. 26, 2011   (KR) .................. 10-2011-0141899

(51) Int. Cl.
*H02J 1/10* (2006.01)
*H02J 3/46* (2006.01)
(Continued)

(52) U.S. Cl.
CPC ............. *H02J 7/0068* (2013.01); *H02J 3/14* (2013.01); *H02J 3/32* (2013.01); *H02J 3/383* (2013.01); *H02J 13/0006* (2013.01); *H02J 13/002* (2013.01); *H02J 13/0062* (2013.01); *H02J 13/0079* (2013.01); *H02J 2003/003* (2013.01); *Y02B 70/3225* (2013.01);
(Continued)

(58) Field of Classification Search
CPC ........ H02J 13/0006; H02J 3/32; H02J 7/0068; H02J 3/383; Y02E 10/563
See application file for complete search history.

(56) References Cited

U.S. PATENT DOCUMENTS

| 2009/0027932 A1* | 1/2009 | Haines | H02J 9/062 363/95 |
| 2009/0216387 A1* | 8/2009 | Klein | H02J 3/14 700/296 |
| 2009/0319090 A1* | 12/2009 | Dillon | G06Q 10/04 700/291 |

(Continued)

FOREIGN PATENT DOCUMENTS

KR   10-2010-0013130 A   2/2010
KR   10-1045326 A   6/2011

*Primary Examiner* — Fritz M Fleming
*Assistant Examiner* — Rasem Mourad
(74) *Attorney, Agent, or Firm* — Sughrue Mion, PLLC (57) ABSTRACT

A charging/discharging control system of an energy storage apparatus includes a weather information collection module, a load information collection module, a load grouping module which classifies a plurality of loads into at least one load group based on a load correlation according to a predetermined condition, and an energy storage apparatus charging/discharging control module which determines a battery charging or discharging level per time slot of each of a plurality of energy storage apparatuses by using at least one of an estimated load amount of each load per time slot, a battery charging amount of the energy storage apparatus per time slot via solar generation, and a battery charging amount per time slot via system power, wherein a particular load corresponding to a lowest rate for a unit load is determined by using battery charging/discharging information and power rate information per time slot.

12 Claims, 7 Drawing Sheets

(51) Int. Cl.
  *H02J 7/00* (2006.01)
  *H02J 3/14* (2006.01)
  *H02J 3/32* (2006.01)
  *H02J 3/38* (2006.01)
  *H02J 13/00* (2006.01)
  *H02J 3/00* (2006.01)

(52) U.S. Cl.
  CPC ......... *Y02B 90/222* (2013.01); *Y02B 90/2615* (2013.01); *Y02B 90/2638* (2013.01); *Y02E 10/563* (2013.01); *Y02E 10/566* (2013.01); *Y02E 40/72* (2013.01); *Y02E 70/30* (2013.01); *Y04S 10/123* (2013.01); *Y04S 20/12* (2013.01); *Y04S 20/222* (2013.01); *Y04S 20/224* (2013.01); *Y04S 40/121* (2013.01); *Y04S 40/124* (2013.01); *Y10T 307/352* (2015.04)

(56) References Cited

U.S. PATENT DOCUMENTS

| | | | |
|---|---|---|---|
| 2010/0198421 A1* | 8/2010 | Fahimi | H02J 3/32 700/291 |
| 2010/0207448 A1* | 8/2010 | Cooper | H02J 3/14 307/20 |
| 2011/0031171 A1* | 2/2011 | Henig | C02F 1/32 210/85 |
| 2011/0068624 A1* | 3/2011 | Dibachi | H02J 7/35 307/18 |
| 2011/0204720 A1* | 8/2011 | Ruiz | B60L 11/1816 307/66 |
| 2012/0158198 A1* | 6/2012 | Black | H02J 3/14 700/291 |
| 2013/0047010 A1* | 2/2013 | Massey | G06Q 10/06 713/320 |

* cited by examiner

METHOD, DEVICE, AND SYSTEM FOR CONTROLLING CHARGING AND DISCHARGING OF ENERGY STORAGE APPARATUS

CROSS-REFERENCE TO RELATED APPLICATIONS

This application claims priority from Korean Patent Application No. 10-2011-0141899, filed on Dec. 26, 2011 in the Korean Intellectual Property Office, the disclosure of which is incorporated herein by reference in its entirety.

BACKGROUND

Field

Exemplary embodiments relate to a method, a device, and a system for controlling charging and/or discharging of an energy storage apparatus, and more particularly, to a method, a device, and a system for controlling charging and/or discharging of a load specific energy storage apparatus based on a load-specific solar generation pattern and load amount estimation.

Description of the Related Art

Recently, due to a sudden rise of oil prices and a corresponding increase in environmental regulations, many restrictions have been placed on existing generators. Thus, there has been an increased global effort to expand distribution of renewable forms of energy, such as solar power and wind power rather than fossil fuel power, for a purpose of conserving the environment through $CO_2$ reduction, despite low economic feasibility due to heavy initial investment.

In the case of solar power generation, because solar power generation is not possible at night, and even during daytime, a solar power generation output may fluctuate depending on weather conditions, a battery is often installed and operated in conjunction with a solar power generation system in order to store a surplus power during a day with plenty of sunshine. Due to recent increases in battery capacity, a price decline of the battery, and a prolonged battery life, combined use of the battery is expected to continue to grow.

However, since meteorological information is not linked to a technology for the combined use of the battery, there are limits to the efficient operation of the battery. In addition, although an output of the solar power generation system and an output of the battery are both direct current (DC) power, in order to provide a power to a DC load, the output of the battery is typically converted to an alternating current and connected to a local wire, and then converted back to the direct current by using a digital device. If DC power generated by the solar power generation system and stored in a high capacity battery can be directly provided to the DC load, power efficiency and power quality may be improved, and conversion equipment contained within the digital device may be removed to the effect of solving or mitigating an environmental problem.

SUMMARY

The present inventive concept has been developed in view of the above problems, and it is an aspect to provide a method and a system for charging/discharging control, in which an operation of a solar power generation system is scheduled based on a load-specific power consumption pattern and estimated weather information, and a charging/discharging function of a battery that belongs to the solar power generation system is scheduled.

An additional aspect is to provide a method and a system for charging/discharging control, which optimizes a charging/discharging level of a solar power generation system and a battery by using a predetermined learning operation.

The technical aspects of the present inventive concept are not limited by the above technical aspects, and other technical aspects that are not mentioned will be apparent to a person of ordinary skill in the art from the following exemplary description.

In one aspect according to one or more exemplary embodiments, a method of controlling charging or discharging of an energy storage apparatus, in which a charging or discharging level of the energy storage apparatus is controlled, includes: classifying a plurality of loads provided with a plurality of energy storage apparatuses into at least one load group based on a load correlation according to a predetermined condition; determining a battery charging or discharging level per time slot of each respective energy storage apparatus provided to each corresponding load in a unit of the load group; operating each respective energy storage apparatus provided to the each corresponding load according to the respective determined battery charging or discharging level; and determining a particular load indicating a lowest rate for a unit load by using battery charging/discharging information and power rate information per time slot, and generating an energy storage apparatus scheduling information based on the battery charging or discharging level corresponding to the particular load. The determining of a battery charging or discharging level may include using at least one of an estimated load amount of each load per time slot, a solar-generated battery charging amount of the respective energy storage apparatus per time slot via solar generation, and a grid-generated battery charging amount per time slot via a grid-connected electronic power system.

The classifying of the plurality of loads may include: building a database configured to store at least one of environment information, weather information, and power consumption information relating to the plurality of the loads that are collected in real time or during a predetermined period; determining one or more loads corresponding to an equivalent area, an equivalent date, and an equivalent weather condition based on information stored in the database; calculating average power consumption information per date by using power consumption information corresponding to the determined one or more loads; and determining the load correlation by using the power consumption information corresponding to the determined one or more loads and the calculated average power consumption information.

The classifying of the plurality of loads may further include: determining, based on the determined load correlation, one or more loads having a same pattern as a plurality of loads which belong to an area having a highest load correlation according to information stored in the database, and classifying the determined one or more loads into a same group.

The determining of a battery charging or discharging level may include: setting an initial value of the estimated load amount by using power consumption information per time slot in the unit of the load group; setting an initial value of the respective solar-generated battery charging amount and the respective grid-generated battery charging amount of the corresponding energy storage apparatus provided to each respective load in the unit of the load group; and determining a respective target charging amount per time slot for each of the plurality of the energy storage apparatuses that belongs to the load group unit, wherein the respective target charging amount per time slot is determined by summing an estimated respective solar-generated battery charging amount and an estimated respective grid-generated battery charging amount.

The initial value of the estimated load amount may be set as being equal to an average power consumption which is determined by using information relating to power consumption per time slot in the unit of the load group.

The initial value of the respective solar-generated battery charging amount may be set as being equal to an average solar-generated battery charging amount which is determined by using information relating to a respective solar-generated battery charging amount per time slot in the unit of the load group, and the initial value of the respective grid-generated battery charging amount may be set to zero.

The estimated respective solar-generated battery charging amount used for determining the respective target charging amount per time slot may be determined as being equal to a maximum solar-generated battery charging amount of a corresponding time slot within a time slot in which the solar generation is available.

The estimated respective grid-generated battery charging amount used for determining the respective target charging amount per time slot may be determined by calculating a sum of an estimated load amount per time slot by accumulating the estimated load amount per time slot, within a predetermined cycle, in the unit of the load group for a predetermined date; and calculating a required respective grid-generated battery charging amount per time slot within the predetermined cycle by using the calculated sum of the estimated load amount and the respective solar-generated battery charging amount of a previous time slot.

According to another aspect of one or more exemplary embodiments, a method of controlling charging or discharging of an energy storage apparatus, in which a charging or discharging level of the energy storage apparatus is controlled, further includes: calculating an actual rate per time slot by using a rate per time slot in the previous time slot and an inverse number of charging/discharging efficiency, and determining a particular time slot for which the calculated actual rate is lowest; comparing a calculated actual rate of a particular time slot which immediately precedes a time slot for which an estimated respective grid-generated battery charging amount is to be determined by using an electricity rate relating to the particular time slot; and compensating the required respective grid-generated battery charging amount based on a result of the comparing.

When the actual rate of the particular time slot is less than the electricity rate of the time slot immediately preceding the particular time slot, the method may further comprise: determining the estimated respective grid-generated battery charging amount by summing the actual respective grid-generated battery charging amount of the particular time slot and the required respective grid-generated battery charging amount per time slot; and compensating the required respective grid-generated battery charging amount per time slot by subtracting the actual respective grid-generated battery charging amount of the particular time slot from the required respective grid-generated battery charging amount per time slot.

According to yet another aspect of one or more exemplary embodiments, a method of controlling charging or discharging of an energy storage apparatus, in which a charging or discharging level of the energy storage apparatus is controlled, further includes: determining a sum of a respective grid-generated battery charging amount per time slot based on a grid-generated battery charging amount per time slot within the predetermined cycle; and comparing the determined sum of the respective grid-generated battery charging amount per time slot with the required respective grid-generated battery charging amount in a same time slot, wherein the determining the estimated respective grid-generated battery charging amount and the compensating the required respective grid-generated battery charging amount are repeatedly performed based on a result of the comparing.

The determining of a battery charging or discharging level may include: determining a discharging level of the energy storage apparatus as being equal to a sum of the respective solar-generated battery charging amount per time slot and the respective grid-generated battery charging amount per time slot minus an estimated load amount per time slot.

The determining a particular load indicating a lowest rate may include: collecting the battery charging/discharging information including the solar-generated battery charging amount, the grid-generated battery charging amount, an actual load amount, and a battery discharging amount in the energy storage apparatus operated according to step (c); determining the particular load corresponding to the lowest rate for the unit load by using the battery charging/discharging information and the power rate information per time slot; and scheduling an optimized charging/discharging level of the energy storage apparatus based on the solar-generated battery charging amount per time slot, the grid-generated battery charging amount, and the battery discharging amount corresponding to the particular load.

The scheduling the optimized charging/discharging level of the energy storage apparatus may include: applying a variation error of a predetermined range to calculate an optimized solar-generated battery charging amount per time slot, an optimized grid-generated battery charging amount, and an optimized battery discharging level determined based on an initial result of the scheduling.

According to still another aspect of one or more exemplary embodiments, a system for controlling charging or discharging of an energy storage apparatus, in which a charging or discharging level of a plurality of energy storage apparatuses using solar generation and system power is controlled, includes a weather information collection module configured to collect weather information corresponding to each of a plurality of loads provided with a corresponding plurality of energy storage apparatuses; a load information collection module configured to collect environment information and power consumption information relating to each of the plurality of the loads; a load grouping module configured to classify the plurality of the loads into at least one load group based on a load correlation according to a predetermined condition; and an energy storage apparatus charging/discharging control module configured to determine a battery charging or discharging level per time slot of each of the plurality of the energy storage apparatuses by using at least one of an estimated load amount of each load per time slot, a solar-generated battery charging amount of the respective energy storage apparatus per time slot via solar generation, and a grid-generated battery charging amount per time slot via a grid-connected electronic power system. The energy storage apparatus charging/discharging control module determines a particular load corresponding to a lowest rate for a unit load by using battery charging/discharging information relating to an operation of the energy storage apparatus based on the determined battery charging or discharging level and power rate information per time slot, and schedules a charging/discharging level of the energy storage apparatus based on the determined battery charging or discharging level corresponding to the particular load.

BRIEF DESCRIPTION OF THE DRAWINGS

The above and other aspects will be more apparent from the following detailed description of exemplary embodiments taken in conjunction with the accompanying drawings, in which.

DETAILED DESCRIPTION OF EXEMPLARY EMBODIMENTS

Exemplary embodiments are described with reference to the accompanying drawings in detail. The same reference numbers are used throughout the drawings to refer to the same or like parts. Detailed descriptions of well-known functions and structures incorporated herein may be omitted to avoid obscuring the subject matter of the exemplary embodiments.

Exemplary embodiments relate to a method and a system for controlling charging/discharging of an energy storage apparatus, and more particularly, to a method and a system for controlling charging/discharging of a load specific energy storage apparatus based on a load specific solar generation pattern and load amount estimation.

Figure 1:
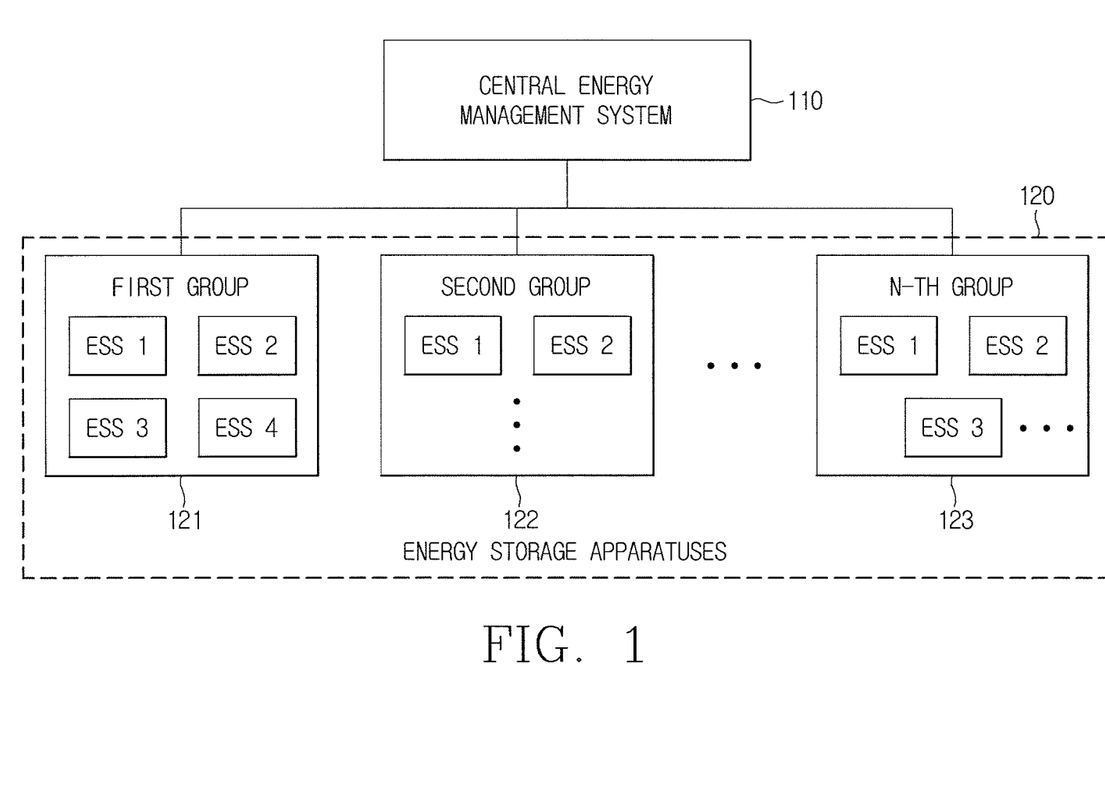
FIG. 1 is a view illustrating an example of an energy management system for controlling charging/discharging of an energy storage apparatus, according to an exemplary embodiment.

FIG. 1 is a view illustrating an example of an energy management system for controlling charging/discharging of an energy storage apparatus, according to an exemplary embodiment.

Referring to FIG. 1, an energy management system 100 according to one or more exemplary embodiments includes a central energy management system 110, which manages an energy consumption pattern of each building, and which controls charging/discharging of a plurality of energy storage apparatuses installed in each building, and a plurality of energy storage apparatuses 120 that are classified according to a predetermined condition.

The energy management system 110 may classify each of a plurality of buildings, each of which is provided with a respective energy storage apparatus, into one or more groups by considering load correlation based on environment information, weather information, and power consumption information relating to a corresponding building. Further, an energy management policy which is based on a characteristic of each group 121, 122, 123 of energy storage systems (ESSs) may be enforced with respect to the respective energy storage apparatus installed in one or more buildings that belong to each group 121, 122, and 123. In particular, with respect to an energy storage apparatus that belongs to a first group 121 and an energy storage apparatus that belongs to a second group 122, independent control policies for respective energy storage apparatuses having different charging/discharging levels may be generated by considering the environment information, the weather information, and the power consumption information relating to a corresponding building that belongs to each group, thereby controlling each corresponding energy storage apparatus.

The foregoing will be briefly described with reference to FIG. 2.

Figure 2:
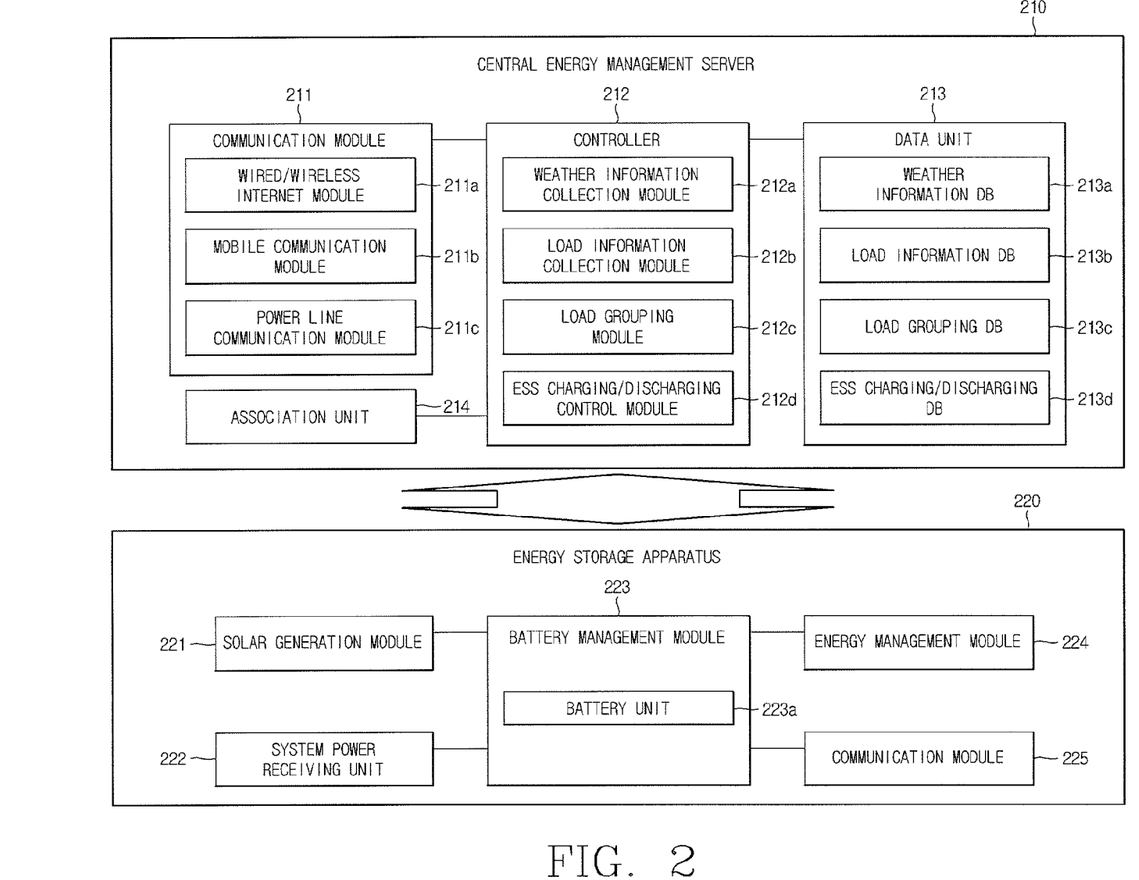
FIG. 2 is a block diagram illustrating a configuration of an energy management system for controlling charging/discharging of an energy storage apparatus, according to an exemplary embodiment.

FIG. 2 is a block diagram illustrating a configuration of an energy management system for controlling charging/discharging of an energy storage apparatus, according to an exemplary embodiment. In FIG. 2, a single energy storage apparatus that represents a plurality of energy storage apparatuses is shown.

Referring to FIG. 2, an energy management system includes a central energy management server 210, which is operated by a central energy management system for controlling an energy consumption pattern of each building and charging and discharging of the corresponding plurality of energy storage apparatuses installed in each respective building, and a plurality of energy storage apparatuses, such as an energy storage apparatus 220, which are classified according to the predetermined condition.

The central energy management server 210 includes a communication module 211 for performing a communication with external communication equipment, a controller 212 for controlling charging/discharging of each of the plurality of the energy storage apparatuses 120 that are classified into one of more groups, a data unit 213 for storing information related to energy management, and an association unit 214 for associating with an external system.

The communication module 211, which is used to perform a wired or wireless communication with a smart box, an electrical device that supports an information technology (IT), a smart tag, and/or a user terminal, may include a wired or wireless internet module 211a, a mobile communication module 211b, and a power line communication module 211c.

The wired or wireless Internet module 211a is a module for accessing wired or wireless internet, and a wired or wireless internet technology such as, for example, a local area network (LAN), wireless LAN (WLAN), wireless fidelity (Wi-Fi), wireless broadband (Wibro), world interoperability for microwave access (Wimax), or high speed downlink packet access (HSDPA) may be used therefor.

The mobile communication module 211b may transmit and receive a wireless signal (e.g., a voice call signal, a video call signal, or a text/multimedia message) to/from at least one of a base station, an external terminal, and a server in a mobile communication network.

The power line communication module 211c is a technology that can access to a high speed internet node by using only an electrical receptacle, i.e., a power line, to transmit, for example, a voice signal, a text data signal, and/or an image signal, and a power line communication (PLC) technology may be used therefor.

The controller 212 generally controls an overall operation of the central energy management server 210. Further, the controller 212 includes a weather information collection module 212a for collecting weather information in a predetermined area, an information collection module 212b for collecting, for example, power consumption information or environment information relating a building or facility to which the predetermined area belongs, a load grouping module 212c for classifying each of the plurality of the energy storage apparatuses that belongs to the predetermined area into one or more groups according to a predetermined condition, and an ESS charging/discharging control module 212d for controlling a charging or discharging state of each of the plurality of the energy storage apparatuses.

In particular, it is assumed that each load (home, a building, a multi-unit building, etc.) for which information is collected by the load information collection module 212b and each load which is grouped by the load grouping module 212c is a load in which the energy storage apparatus 220 is installed or a load associated with the energy storage apparatus 220.

The weather information collection module 212a, in association with an external weather information management system, collects weather information relating to an area in which a plurality of home, buildings, or multi-unit buildings that belong to the predetermined area managed by the central energy management system are located and transmits the collected information to the data unit 213. The weather information may include, for example, forecast weather information such as sunny, partly cloudy, mostly cloudy, rainy, etc. in connection with solar power generation.

The load information collection module 212b collects power consumption information (e.g., power consumption amount information and power rate information) relating to a home, a building, or a multi-unit building that is a unit load of a consumer unit, and classifies the collected information according to a predetermined condition to be stored in the data unit 213. Further, even if each home, building or multi-unit building in which the energy storage apparatus is installed is in an equivalent location and an equivalent weather condition, an amount of solar power generation in each building may vary based on structural features or orientation, and thus, environment information relating to a building in which the energy storage apparatus is installed is also collected.

The load grouping module 212c calculates load correlation based on the weather information, the environment information, and the power consumption information relating to each of the plurality of homes, buildings, or multi-unit buildings equipped with the energy storage apparatus, which belongs to the predetermined area managed by the central energy management system. Further, a load grouping operation is performed to classify a plurality of buildings for which a load pattern is the same as that of an area having the highest load correlation into one group. This load grouping operation is further described below with reference to FIG. 3.

The ESS charging/discharging control module 212d controls charging and discharging of each of a plurality of energy storage apparatuses and/or each energy storage apparatus group that is classified into the same group by the load grouping module 212c. Specifically, the energy storage apparatus generates ESS charging/discharging scheduling information to control each energy storage apparatus, wherein the ESS charging/discharging scheduling information includes, for example, a charging amount per hour/day/month/year (e.g., an amount of battery charging by the solar power generation system, an amount of charging by a grid-connected electronic power system, etc.), a discharging amount, a charging method, a charging level, and/or a discharging level. This control process is further described below with reference to FIGS. 4 and 5.

Further, the ESS charging/discharging control module 212d may generate optimized energy charging/discharging scheduling information which is determined within a predetermined period or a predetermined number of learning cycles such that an optimal energy charging or discharging level is satisfied by considering the power consumption information (i.e., the power consumption amount information or power rate information), which is collected in real time from the load based on the ESS charging/discharging scheduling information.

Accordingly, the controller 212 may control an energy charging/discharging level of each of the plurality of the energy storage apparatuses managed by the central energy management system via various steps performed by each element.

Next, the data unit 213 includes a weather information database (DB) 213a for storing information associated with energy storage apparatus management and the weather information, a load information DB 213b for storing power consumption information relating to a load at each home, building, or multi-unit building and the corresponding environment information, a load grouping DB 213c for storing load grouping information relating to respective loads classified into a corresponding plurality of groups and a grouping condition, and an ESS charging/discharging DB 213d for storing the ESS charging/discharging scheduling information generated by the controller 212.

In an exemplary embodiment, a communication module 211 includes one or more hardware and/or software components, such as, for example, a transmitter, a receiver, a transceiver, and/or software programs which implement functions relating to communication. A controller 212 includes one or more hardware and/or software components. For example, a controller may include one or more of integrated circuitry, dedicated circuits, firmware, and/or a processor which executes software programs for collecting, grouping, and controlling as described above. The data unit 213 may include a memory, such as, for example, random-access memory (RAM), read-only memory (ROM), compact disc-ROM (CD-ROM), or any other type of memory. The association unit 214 includes one or more hardware and/or software components.

Referring to FIG. 2, the energy storage apparatus 220 includes a solar generation module 221 for generating electrical energy from sunlight collected by a predetermined light collecting apparatus, a system power receiving unit 222 for providing power from a system such as, for example, a grid-connected electronic power system, a battery management module 223 for controlling a charging or discharging level of a battery unit 223a according to a control of the central energy management system 210 based on the power provided by the solar generation module 221 or the system power receiving unit 222, an energy management module 224 for managing power within the energy storage apparatus, and a communication module 225 for performing a wired or wireless communication with the central energy management system.

At least one of the solar generation module 221, the battery management module 223, the battery unit 223a, and the energy management module 224 controls, for example, solar generation, a solar-generated battery charging amount, a grid-generated battery charging amount, a battery charging level, and/or a battery discharging level according to the ESS charging/discharging scheduling information received from a central control system. The energy storage apparatus 220 may further include a processor, such as, for example, an integrated circuit, dedicated circuitry, or a microprocessor chip configured to execute software programs for implementing respective functions, and/or a memory, such as a RAM or a ROM. In addition, each of the solar generation module 221, the battery management module 223, the energy management module 224, and the communication module 225 may include a processor and/or a memory.

Next, a method of managing a charging/discharging state of the energy storage apparatus in the energy management system according to an exemplary embodiment is described.

1. Determining Load Grouping

Figure 3:
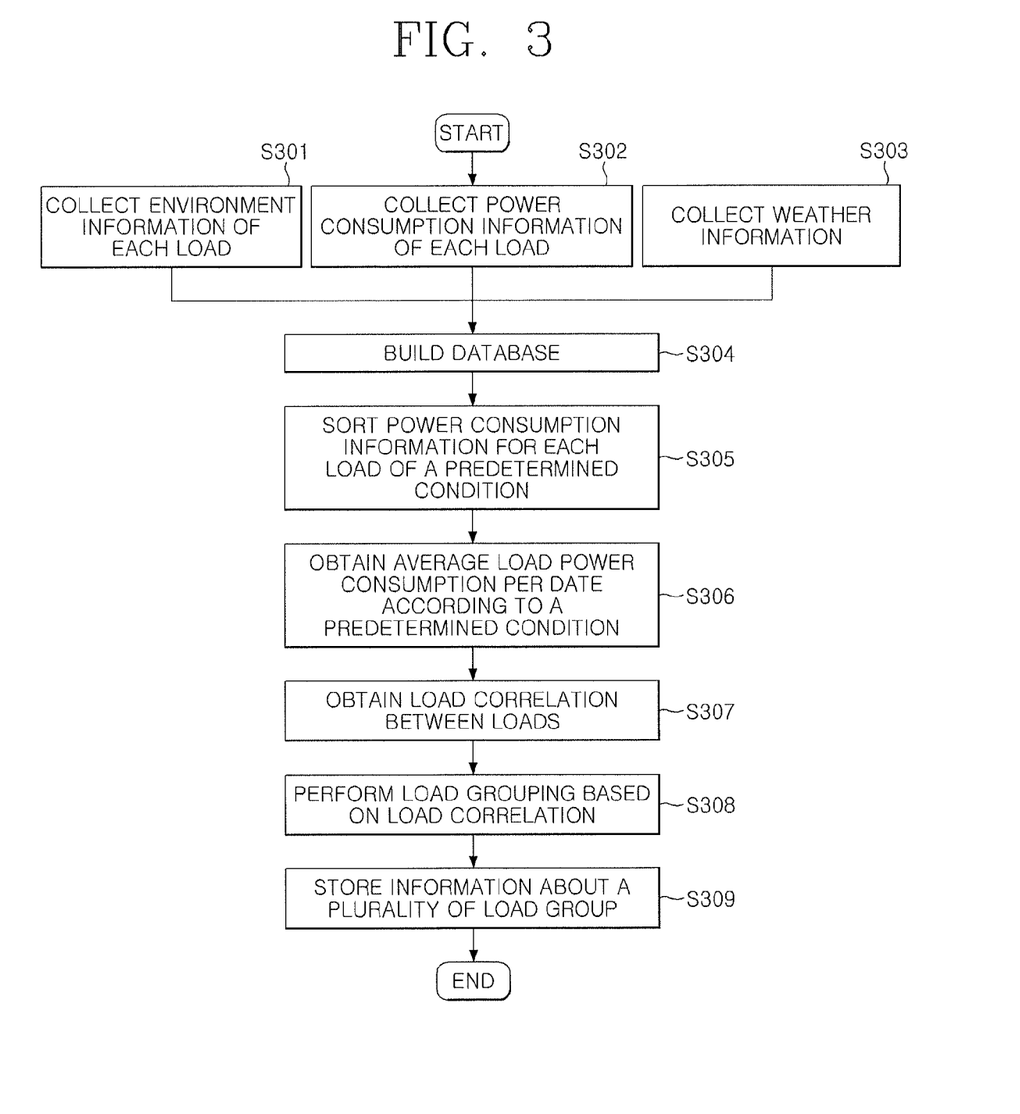
FIG. 3 is a flow chart illustrating an exemplary process for performing load grouping in an energy management system, according to an exemplary embodiment.

FIG. 3 is a flow chart illustrating an exemplary process for performing load grouping in an energy management system, according to an exemplary embodiment.

Referring to FIG. 3, in operation S301, the energy management system collects the environment information relating to each of a plurality of home/building/multi-unit buildings (hereinafter referred to as "loads") that is equipped with the energy storage apparatus that belongs to the predetermined area, and then, in operations S302 and S303, collects the power consumption information (i.e., the power consumption amount information and the power rate information) and the weather information during a predetermined period or in real time in order to build a database in operation S304 by classifying the collected information by hour/day/month/year (i.e., per unit time).

Next, in operation S305, the energy management system sorts the power consumption amount information relating to each load (i.e., a respective amount measured at the load) in an order of date based on information stored in the built database. For example, power consumption information at each load in the same month of a previous year can be sorted in the order of date, and the sorted power consumption information of each load is referred to as $L_{in}$. In particular, i represents a date on which corresponding information is measured, and n represents a load number.

Next, in operation S306, the power consumption information of one or more loads having the same weather condition on the same date in the same area is determined by using information stored in the database to calculate an average value for each date. The average power consumption information relating to loads that satisfy the same condition per date is referred to as $ML_{ij}$. In particular, i represents a date of a corresponding average value, and j represents area information. The corresponding data can be referred to as a model load amount of a particular month in a particular area under particular weather information.

In operation S307, a load correlation $C_{ij}$ is determined by using the power consumption information $L_{in}$ for each load obtained in operation S305 and the average power consumption information $ML_{ij}$ of loads per date calculated in operation S306.

Equation 1, which may be used to calculate the load correlation according to an exemplary embodiment, shows the load correlation on a particular date (i) in a particular area (j).

$$C_{ij} = \frac{\sum_{i=1}^{31}(L_{in} - \overline{L})(ML_{ij} - \overline{ML})}{\sqrt{\sum_{i=1}^{31}(L_{in} - \overline{L})^2 \sum_{i=1}^{31}(ML_{ij} - \overline{ML})^2}} \quad \text{[Equation 1]}$$

In Equation 1, the load correlation is calculated based on the power consumption information relating to each load for one month comprising 31 days, wherein $\overline{L}$ represents an average power consumption of each load, and $\overline{ML}$ represents an average power consumption of loads having the same weather condition and located in the same area.

In operation S308, the energy management system determines furniture, a building, or a multi-building having the same load pattern as an area for which correlation is the highest among the load correlations calculated based on information stored in the database, and groups the determined furniture, building, or multi-building into the same load group. The load grouping has the same significance as an ESS grouping with respect to the energy storage apparatus installed in each load.

Thus, in operation S309, when one or more groups are generated through a load grouping process, the energy management system stores information relating to the one or more generated groups in the database to be managed.

2. Determining a Charging Level of the Energy Storage Apparatus

Figure 4:
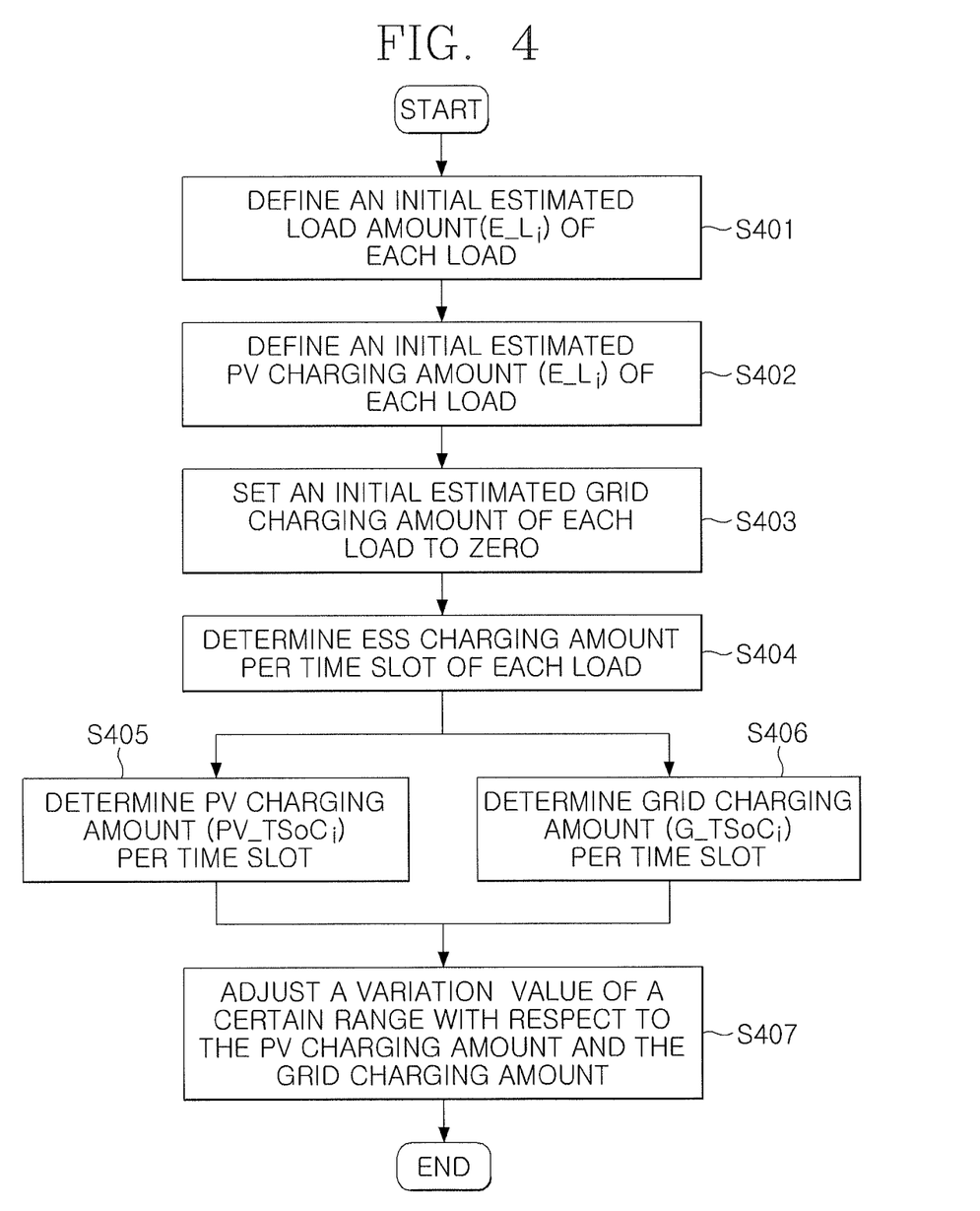
FIG. 4 is a flow chart illustrating an exemplary process for determining a charging level of an energy storage apparatus in an energy management system, according to an exemplary embodiment.

FIG. 4 is a flow chart illustrating an exemplary process for determining a charging level of an energy storage apparatus in an energy management system, according to an exemplary embodiment.

Hereinafter, it is assumed that the process for determining an energy charging level as described below is preceded by the load grouping process described above with respect to FIG. 3, and is performed independently for each load group.

Referring to FIG. 4, in operation S401, in order to set an initial value for each of several required variables, prior to operating the ESS charging scheduling, the energy management system measures power consumption of each load per time slot of a day in a unit of group during a predetermined period and calculates an average value, wherein the calculated average value is defined as an initial power consumption or initial estimated load amount ($E\_L_i$) with respect to a corresponding group.

Further, in operation S402, in the energy storage apparatus, a solar-generated battery charging amount (hereinafter, referred to as a "PV charging amount" or a "solar-generated battery charging amount") via solar power generation per time slot of a day during a predetermined period is measured to calculate an average value, and the calculated average value is defined as an initial PV charging amount or an estimated PV charging amount ($E\_PV_i$) with respect to a corresponding group.

In operation S403, an initial value of the grid-generated battery charging amount using a grid-connected electronic power system (hereinafter, referred to as "grid charging amount" or "grid-generated battery charging amount") is defined as being equal to zero.

Next, in operation S404, the energy management system determines a charging amount of the energy storage apparatus for each time slot in a unit of load group, and determines a target charging amount (Target SoC; $TSoC_{total}$) as being equal to an entire power consumption of each load on a particular date for which a charging amount is to be determined, excluding a current energy amount remaining on a battery.

The target charging amount of the energy storage apparatus of each time slot determined in operation S404 may be determined as being equal to a sum of the estimated PV charging amount ($PV\_TSoC_i$, wherein i represents a time slot) and an estimated grid charging amount ($G\_TSoC_i$).

First, in operation S405, in determining the PV charging amount, in a time slot in which solar power generation (i.e., PV charging) is available, a maximum PV charging amount of a corresponding time slot is determined as being equal to the estimated PV charging amount ($PV\_TSoC_i$).

Next, in operation S406, the grid charging amount ($G\_TSoC_i$) for each time slot is determined by using the grid-generated system power, which process is described further below with reference to FIG. 5.

Next, in operation S407, a variation value is adjusted to provide a Gaussian distribution within a predetermined range of the PV charging amount ($PV\_TSoC_i$) per time slot and the grid charging amount ($G\_TSoC_i$). For example, the PV charging amount per time slot and the grid charging amount may be adjusted at random by adding a variation value within a ±5% variation thereof in order to provide a Gaussian distribution.

Figure 5:
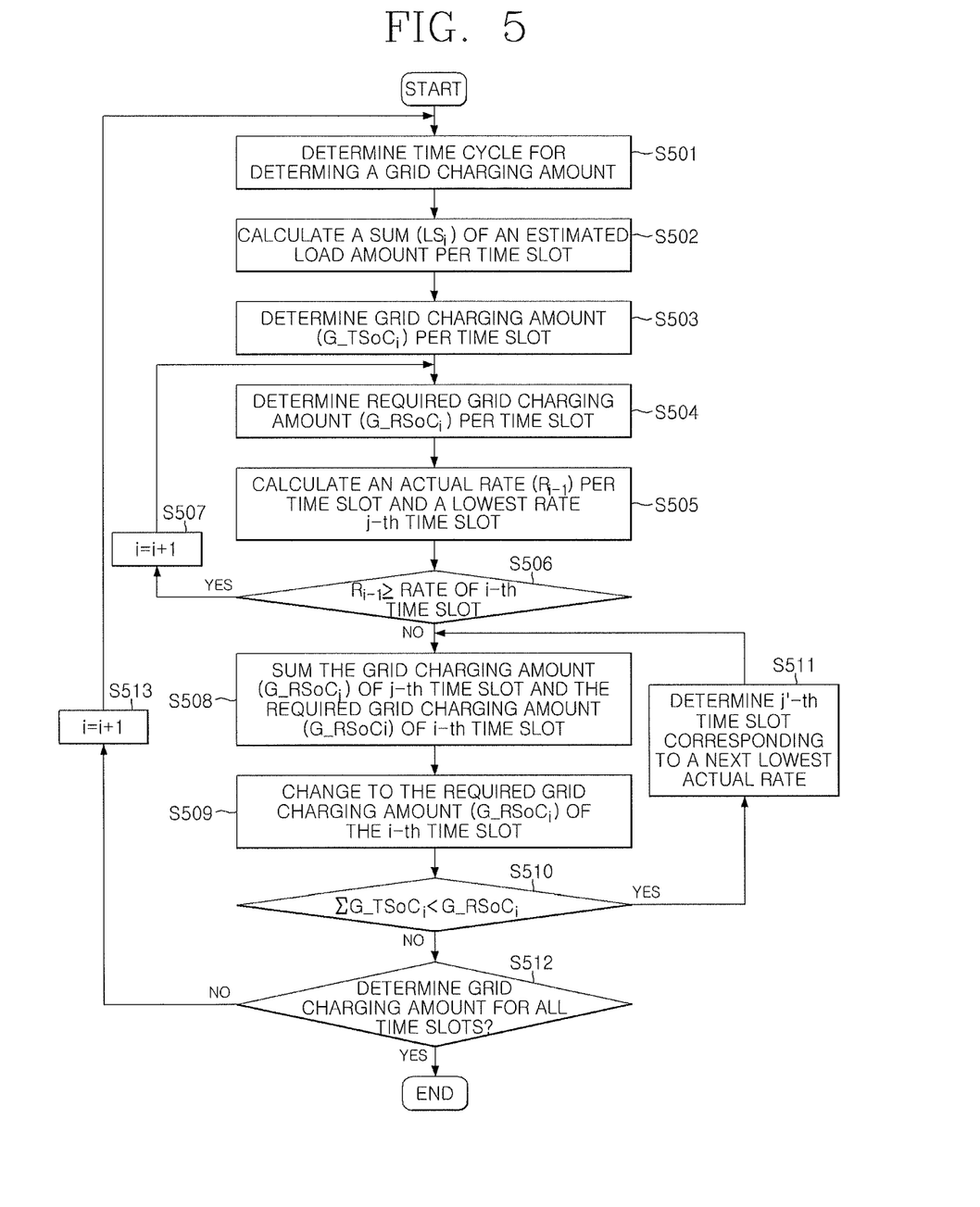
FIG. 5 is a flow chart illustrating an exemplary process for charging an energy storage apparatus from a grid-generated system power in an energy management system, according to an exemplary embodiment.

FIG. 5 is a flow chart illustrating an exemplary process for charging an energy storage apparatus from a grid-generated system power in an energy management system, according to an exemplary embodiment.

Referring to FIG. 5, in operation S501, in the energy management system, in order to determine the grid charging amount per time slot, an earliest time of a time slot of a day having a lowest electricity rate is determined as a starting point of a cycle, and one hour earlier the next day under the same requirements is determined as an ending point of the cycle. For example, when the electricity rate is lowest during a time slot between 3 A.M. to 5 A.M. of the day, the starting point of a cycle is 3 A.M. on a particular day, and the ending point is 2 A.M. on the next day.

Next, in operation S502, the energy management system determines a sum ($LS_i$) of the estimated load amount per time slot from midnight to a particular i-th time slot, wherein i is in a range of 0-23.

Next, in operation S503, the grid charging amount ($G\_TSoC_i$) per time slot is determined subsequently from a starting time slot to an ending time slot. The initial value of the grid charging amount is set to zero.

Next, in operation S504, a required grid charging amount ($G\_RSoC_i$) that needs to be charged from the grid-generated system power during an interval between the starting time slot and a given particular i-th time slot is calculated based on, as shown in Equation 2, a sum ($LS_i$) of the estimated load amount up to the particular time slot and a sum of the PV charging amounts ($\Sigma PV\_TSoC_{i-1}$) up to a previous time slot.

$$G\_RSoC_i = LS_i - \Sigma PV\_TSoC_{i-1} \qquad \text{[Equation 2]}$$

Next, in operation S505, an actual rate $R_{i-1}$ per time slot is obtained by multiplying an electricity rate of a time slot that is assigned a lowest rate from among the starting time slots to an (i-1) time slot having an inverse number of a charging/discharging efficiency, and a j-th time slot having a lowest actual rate is determined.

In operation S506, a determination of whether the actual rate Ri-1 per time slot is greater than or equal to a rate of the i-th time slot is made. If it is determined that Ri-1 is greater than or equal to the rate of the i-th time slot (i.e., "Yes" in operation S506), then i is incremented by one in operation S507 and the process returns to operation S504 to repeat subsequent operations. When i becomes greater than 23 after several repetitions, i is reset to zero, and when i becomes a value indicating the starting time slot, a corresponding process is terminated.

Conversely, when the actual rate Ri-1 per time slot is less than the rate of the i-th time slot (i.e., "No" in operation S506), the grid charging amount ($G\_TSoC_j$) in the j-th time slot and the required grid charging amount ($G\_RSoC_i$) in the i-th time slot are summed in operation S508. In particular, the grid charging amount ($G\_TSoC_j$) in the j-th time slot has an upper limit of a maximum system charging amount (G1max) that can be charged from the system for one hour.

Next, in operation S509, as shown in Equation 3, the required grid charging amount ($G\_RSoC_i$) in the i-th time slot is changed to a value which is determined by subtracting the grid charging amount ($G\_TSoC_j$) in the j-th time slot, calculated in operation S503, from the required grid charging amount ($G\_RSoC_i$) in the i-th time slot.

$$G'\_RSoC_i = G\_RSoC_i - G\_TSoC_j \qquad \text{[Equation 3]}$$

Next, in operation S510, a total grid charging amount ($\Sigma G\_TSoC_i$), which is determined by summing the grid charging amounts from the starting point to the particular i-th time slot, is compared to the required grid charging amount ($G\_RSoC_i$) of the i-th time slot, and when the total grid charging amount ($\Sigma G\_TSoC_i$) is less than the required grid charging amount ($G\_RSoC_i$) (i.e., "Yes" in operation S510), a j'-th time slot having a next lowest actual rate is determined in operation S511; and, when an actual rate of a corresponding time slot is lower than the i-th time slot, the process returns to operation S508 to sum the grid charging amount ($G\_TSoC_{j'}$) of the j'-th time slot and the required grid charging amount ($G\_RSoC_i$) of the i-th time slot.

The operations S508, S509, S510, and S511 are repeated up to a time point at which the total grid charging amount ($\Sigma G\_TSoC_i$), which is obtained by summing the grid charging amounts from the starting point to the particular i-th time slot, becomes equivalent to the required grid charging amount ($G\_RSoC_i$) of the i-th time slot (i.e., "No" in operation S510).

Next, in operations S512 and S513, the above-described process is repeatedly performed by incrementing i one by one until the grid charging amount ($G\_TSoC_i$) is determined for all time slots. In particular, in operation S512, a determination regarding whether the grid charging amount has been determined for all time slots is made. If there are remaining time slots for which the grid charging amount has not been determined (i.e., "No" in operation S512), i is incremented by one in operation S513, and the entire process is repeated. If the grid charging amount has been determined for all time slots (i.e., "Yes" in operation S512), then the process ends.

By execution of the above-described process, the energy management system according to an exemplary embodiment may be used to determine the charging amount and the charging level of the energy storage apparatus.

3. Determining a Discharging Level of the Energy Storage Apparatus

The energy management system, according to one or more exemplary embodiments as described above, determines the discharging level of the energy storage apparatus by using the solar-generated battery charging amount ($PV\_TSoC_i$) per time slot, the grid-generated battery charging amount ($G\_TSoC_i$) per time slot, and the estimated load amount ($L_i$) per time slot.

Equation 4 is used to calculate a discharging amount ($D\_SoC_i$) per time slot of the energy storage apparatus, according to an exemplary embodiment.

$$D\_SoC_i = PV\_TSoC_i + G\_TSoC_i - L_i \quad \text{[Equation 4]}$$

The discharging amount of the energy storage apparatus calculated by Equation 4 may be determined as a lowest level for battery protection.

4. Performing Charging/Discharging of the Energy Storage Apparatus

The energy management system, according to an exemplary embodiment, controls to perform charging or discharging of energy from the energy storage apparatus based on information relating to the charging amount and the discharging amount of the energy storage apparatus, as determined via execution of the process described above.

Figure 6:
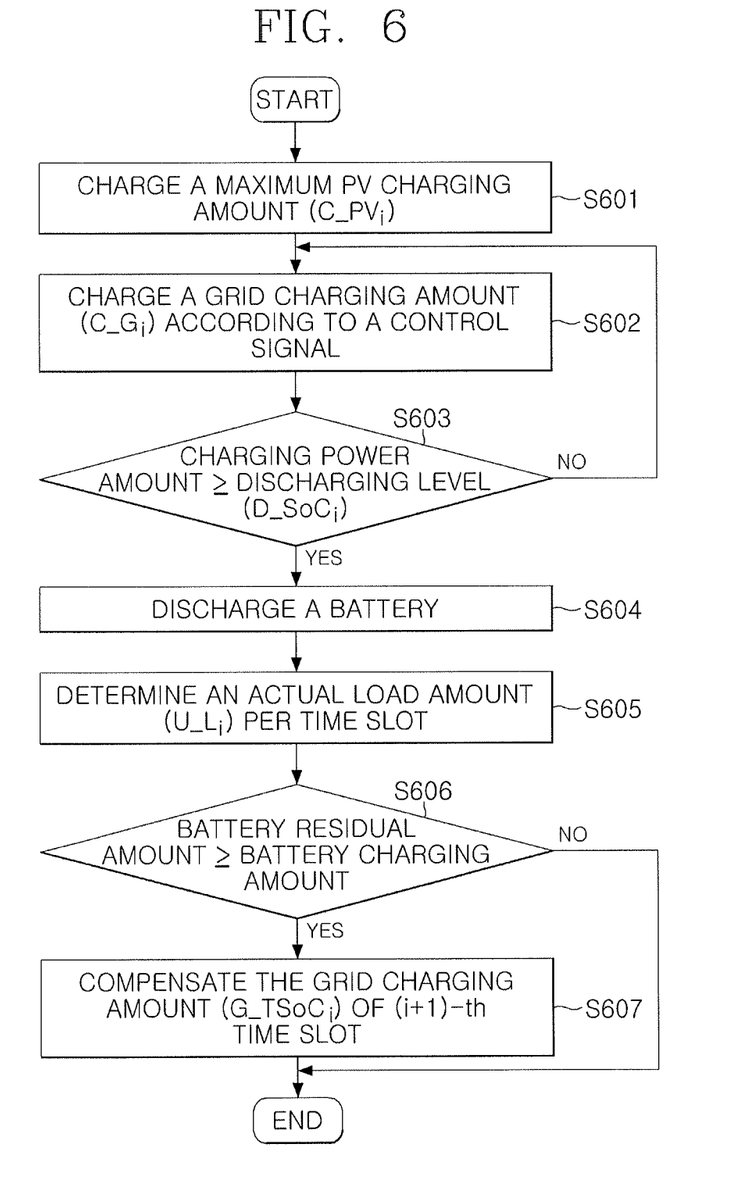
FIG. 6 is a flow chart illustrating an exemplary process for performing charging/discharging of an energy storage apparatus in each time slot in an energy management system, according to an exemplary embodiment.

FIG. 6 is a flow chart illustrating an exemplary process for performing charging/discharging of an energy storage apparatus in each time slot in an energy management system, according to an exemplary embodiment.

Referring to FIG. 6, in operation S601, the energy storage apparatus charges a maximum possible amount that the battery can receive by using a solar charging module, without being limited by battery charging, and an amount of PV charged energy (i.e., solar-generated energy) is represented as $C\_PV_i$.

In addition, in operation S602, the energy storage apparatus charges a grid charging amount included in a control signal determined according to a method described above with reference to FIG. 5 by using battery charging via the grid-generated system power, and an amount of grid-generated system charged energy is represented as $C\_G_i$.

Thus, in operation S603, when a certain amount of energy is charged in the energy storage apparatus, the energy storage apparatus has a load present therein, and compares a charged power level of the battery per time slot to the discharging level ($D\_SoC_i$), described with respect to Equation 4, corresponding to the same time slot, and when the charged power level in a corresponding time slot is less than the discharging level (i.e., "No" in operation S603), the system power continues to be charged by repeating operation S602, and, in operation S604, when the charged power level is not less than the discharging level (i.e., "Yes" in operation S603), the battery is discharged.

In particular, in operation S605, an actual load amount ($U\_L_i$) of a corresponding time slot may be determined as being equal to a sum of an amount of energy ($D\_BAT_i$) that is discharged from the energy storage apparatus in the corresponding time slot and an amount of power provided from the system.

Next, in operation S606, in order to compensate an energy charging amount of the energy storage apparatus in a next time slot, a battery residual energy amount per time slot in accordance with charging and discharging energy is compared to the charging amount per time slot determined by the energy management system.

Equation 5 is used to compare the battery residual energy amount and the charging amount per time slot determined by the energy management system. The battery residual energy amount can be represented as a difference between the amount of the solar-generated PV charged energy ($C\_PV_i$) and the amount of the grid-generated system charged energy ($C\_G_i$) per time slot charged in a previous step and an energy discharging amount. Further, the charging amount per time slot determined by the energy management system can be represented by a sum of the PV charging amount ($PV\_TSoC_i$) and the grid-generated charging amount ($G\_TSoC_i$).

$$C\_PV_i + C\_G_i - D\_BAT_i >= PV\_TSoC_i + G\_TSoC_i \quad \text{[Equation 5]}$$

In operation S607, when the above Equation 5 is satisfied, the grid charging amount ($G\_TSoC_{i+1}$) of the energy storage apparatus in the next time slot (i.e., (i+1)-th time slot) is reduced by a difference between the battery residual energy amount and the battery charging amount determined by the energy management system. When the grid charging amount ($G\_TSoC_{i+1}$) becomes lower than zero, a compensated charging value in the (i+1)-th time slot is set to zero (S607).

5. Determining an Optimized Charging/Discharging Level of the Energy Storage Apparatus After performing charging/discharging of the battery in each energy storage apparatus by execution of the above-described process, the energy management system may determine an optimized charging/discharging level of the energy storage apparatus by using a predetermined learning process based on battery charging/discharging information and power consumption information of each load in each energy storage apparatus.

Figure 7:
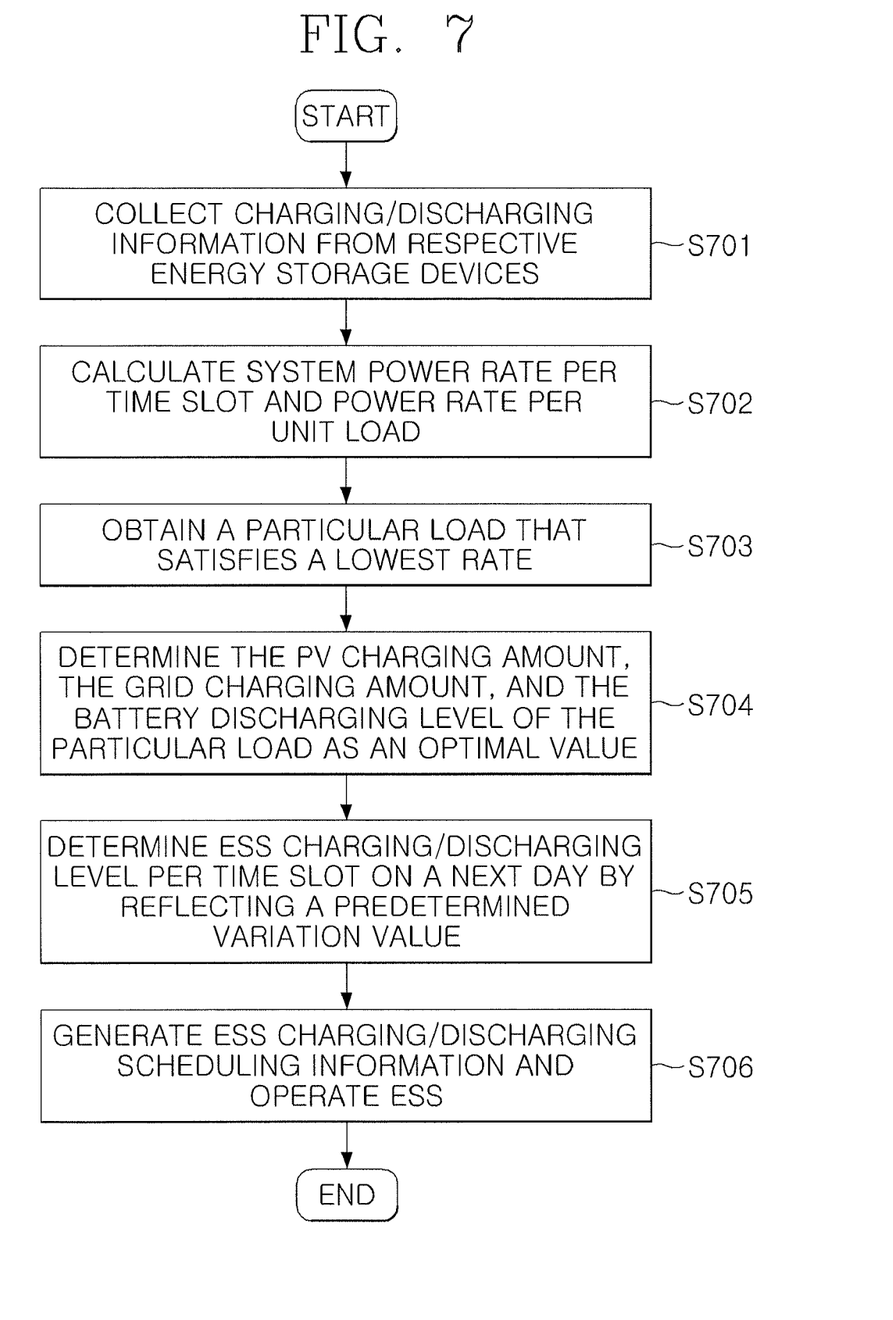
FIG. 7 is a flow chart illustrating an exemplary process for determining an optimized charging/discharging level of an energy storage apparatus in an energy management system, according to an exemplary embodiment.

FIG. 7 is a flow chart illustrating an exemplary process for determining an optimized charging/discharging level of an energy storage apparatus in an energy management system, according to an exemplary embodiment.

Referring to FIG. 7, in operation S701, the energy management system receives, from the energy storage apparatus, the battery charging/discharging information based on a result of performing charging or discharging the battery in the particular time slot (i.e., i-th time slot), as described above with reference to FIG. 6. The battery charging/discharging information includes the amount of the solar-generated PV charged energy ($C\_PV_i$) per time slot based on a particular time on a previous day, the actual load amount ($U\_L_i$), the amount of the grid-generated system charged energy ($C\_G_i$), and the battery discharging amount ($D\_BAT_i$) in the energy storage apparatus provided to each load.

Next, in operation S702, the energy management system calculates a system power rate per time slot and a power rate per unit load for each load based on the battery charging/discharging information received in a previous operation and the data unit. When $GR_i$ represents the system power rate per time slot, a cost of the power rate per unit load can be expressed as Equation 6 by using the actual load amount ($U\_L_i$), the battery discharging amount ($D\_BAT_i$), the amount of the system charged energy ($C\_G_i$), and the system power rate per time slot.

$$\Sigma(U\_L_i - D\_BAT_i + C\_G_i) * GR_i / \Sigma U\_L_i \quad \text{[Equation 6]}$$

Next, in operation S703, the energy management system determines a particular load indicating a lowest power rate per unit load, which is calculated as shown in Equation 6, from among a plurality of loads that belong to the same load group.

Further, in operation S704, the solar-generated PV charging amount ($PV\_TSoC_i$), the grid-generated charging amount ($G\_TSoC_i$), and the battery discharging level ($D\_SoC_i$) of the particular load indicating the lowest power rate per unit load are selected and set as an optimal PV charging amount ($BE\_PV\_TSoC_i$), an optimal grid charging amount ($BE\_G\_TSoC_i$), and an optimal battery discharging level ($BE\_D\_SoC_i$) for a corresponding month, day, and time slot.

Next, in operation S705, by using the battery charging/discharging information determined in operation S704, the energy management system determines a charging/discharging level of the energy storage apparatus per time slot on a next day having a predetermined variation value. For example, the optimal PV charging amount, the optimal grid charging amount, and the optimal battery discharging level may be determined by applying a random variation value in a predetermined range (e.g., ±5%) with respect to the optimal PV charging amount ($BE\_PV\_TSoC_i$), the optimal grid charging amount ($BE\_G\_TSoC_i$), and the optimal battery discharging level ($BE\_D\_SoC_i$) that are determined in operation S704 per month, day and time slot.

Next, in operation S706, the energy management system generates the ESS charging/discharging scheduling information, including the optimal PV charging amount, the optimal grid charging amount, and the optimal battery discharging level to which a random variation value having a predetermined range is applied, and operates the ESS accordingly.

Conversely, prior to determining the optimal charging/discharging level in operation S705, the energy management system may update the estimated load amount ($E\_L_i$) and the estimated charging amount ($E\_PV_i$) that are set prior to operating the ESS by performing charging according to scheduling determined as described above with reference to FIG. 4, based on the information collected from respective loads. For example, collected information relating to the actual load amount may be classified per each load group, and then a load average value ($U\_ML_i$) per time slot may be determined in order to calculate, as shown in Equation 7, a new estimated load amount (ELL).

$$E'\_L_i = 0.8*E\_L_i + 0.2*U\_ML_i \quad \text{[Equation 7]}$$

Further, the collected information relating to the actual load amount may be classified per each load group in order to determine a charging average value ($C\_PVM_i$) per time slot so that a new estimated charging amount ($E'\_PV_i$) may be calculated, as shown in Equation 8.

$$E'\_PV_i = 0.8*E\_PV_i + 0.2*U\_PVM_i \quad \text{[Equation 8]}$$

A process for updating the estimated load amount and the estimated charging amount may be executed in order to update base information for controlling the energy storage apparatus, and can be applied to determining the charging/discharging level of the energy storage apparatus per time slot on a next day, as performed in operation S705.

Thus, the energy management system according to one or more exemplary embodiments generates optimal ESS charging/discharging scheduling information to control an energy storage apparatus of each load group.

Further, the energy management system according to one or more exemplary embodiments may obtain an optimized charging/discharging level via learning by repeatedly executing an energy charging/discharging process with respect to the energy storage apparatus, as described above with reference to FIG. 6, and a process for optimizing a charging/discharging scheduling based on information according to an energy charging/discharging performing operation, as described above with reference to FIG. 7.

According to the present disclosure, an operation of a solar power generation system is scheduled based on a load-specific power consumption pattern and estimated weather information, and a charging/discharging level of a battery that belongs to the solar power generation system is optimized by using a predetermined learning operation, thereby enhancing efficiency and stability in producing power energy.

In the above, although the exemplary embodiments have been described with reference to the accompanying drawings, a person skilled in the art should apprehend that the present inventive concept can be embodied in other specific forms without departing from the technical spirit or essential characteristics thereof. Thus, embodiments described above should be construed as exemplary in every aspect and not limiting.

What is claimed is:

1. A method for controlling charging or discharging of an energy storage apparatus, the method comprising:
   grouping, by a processor, a plurality of loads provided with a plurality of energy storage apparatuses into a plurality of load groups based on a load correlation which is calculated based on a predetermined condition;
   determining, by the processor, a battery charging or discharging level per time slot of each respective energy storage apparatus provided to each corresponding load in the load group, wherein the determining the battery charging or discharging level comprises setting an initial value of an estimated load amount by using power consumption information per time slot in the load group, setting an initial value of a respective solar-generated battery charging amount and a respective grid-generated battery charging amount of the corresponding energy storage apparatus provided to each respective load in the load group, and determining a respective target charging amount per time slot for each of the plurality of the energy storage apparatuses that belongs to the load group by summing an estimated respective solar-generated battery charging amount and an estimated respective grid-generated battery charging amount;
   operating said each respective energy storage apparatus based on the respective determined battery charging or discharging level;
   determining a particular load indicating a lowest rate for a load by using battery charging/discharging information and power rate information per time slot, and generating an energy storage apparatus scheduling information based on the battery charging or discharging level corresponding to the determined particular load;
   calculating an actual rate per time slot by using the rate in a previous time slot and an inverse of charging/discharging efficiency, and determining a time slot for which the calculated actual rate is lowest;
   comparing a calculated actual rate of a first time slot which immediately precedes a time slot for which the estimated respective grid-generated battery charging amount is to be determined by using an electricity rate relating to the first time slot; and
   compensating the estimated respective grid-generated battery charging amount based on a result of the comparing.

2. The method of claim 1, wherein the classifying the plurality of loads comprises:
   building a database configured to store at least one of environment information, weather information, and power consumption information relating to the plurality of the loads and that are collected in real time or during a predetermined period of time;
   determining at least one load corresponding to an equivalent area, an equivalent date, and an equivalent weather condition based on information stored in the database;
   calculating average power consumption information per date based on power consumption information corresponding to the determined at least one load; and
   determining the load correlation based on the power consumption information corresponding to the determined at least one load and the calculated average power consumption information.

3. The method of claim 2, wherein the classifying the plurality of loads further comprises:
determining, based on the determined load correlation, at least one load having same pattern as a set of loads which belong to an area having a highest load correlation according to the information stored in the database, and classifying the at least one determined load into same group.

4. The method of claim 1, wherein the initial value of the estimated load amount is set as being equal to an average power consumption which is determined by using information relating to power consumption per time slot in the load group.

5. The method of claim 1, wherein the initial value of the respective solar-generated battery charging amount is set as being equal to an average solar-generated battery charging amount which is determined by using information relating to a respective solar-generated battery charging amount per time slot in the unit of the load group, and the initial value of the respective grid-generated battery charging amount is set to zero.

6. The method of claim 1, wherein the estimated respective solar-generated battery charging amount used for determining the respective target charging amount per time slot is determined as being equal to a maximum solar-generated battery charging amount of a corresponding time slot within a time slot in which the solar generation is available.

7. The method of claim 1, wherein the estimated respective grid-generated battery charging amount used for determining the respective target charging amount per time slot is determined by:
calculating a sum of an estimated load amount per time slot by accumulating the estimated load amount per time slot, within a predetermined cycle, in the load group for a predetermined date; and
calculating a required respective grid-generated battery charging amount per time slot within the predetermined cycle by using the calculated sum of the estimated load amount and the respective solar-generated battery charging amount of a previous time slot.

8. The method of claim 1, wherein, when the actual rate of the first time slot is less than the electricity rate of the time slot immediately preceding the first time slot, the method further comprises:
determining the estimated respective grid-generated battery charging amount by summing the actual respective grid-generated battery charging amount of the first time slot and the required respective grid-generated battery charging amount per time slot; and
compensating the required respective grid-generated battery charging amount per time slot by subtracting the actual respective grid-generated battery charging amount of the first time slot from the required respective grid-generated battery charging amount per time slot.

9. The method of claim 8, further comprising:
determining a sum of a respective grid-generated battery charging amount per time slot based on a grid-generated battery charging amount per time slot within the predetermined cycle; and
comparing the determined sum of the respective grid-generated battery charging amount per time slot with the required respective grid-generated charging amount in a same time slot, wherein the determining the estimated respective grid-generated battery charging amount and the compensating the required respective grid-generated battery charging amount are repeatedly performed based on a result of the comparing.

10. The method of claim 1, wherein the determining a battery charging or discharging level comprises:
determining a discharging level of the energy storage apparatus as being equal to a sum of the respective solar-generated battery charging amount per time slot and the respective grid-generated battery charging amount per time slot minus an estimated load amount per time slot.

11. The method of claim 1, wherein the determining a particular load indicating a lowest rate comprises:
collecting the battery charging/discharging information including the solar-generated battery charging amount, the grid-generated battery charging amount, an actual load amount, and a battery discharging amount in the energy storage apparatus operated according to the operating of said each respective energy storage apparatus;
determining the particular load corresponding to the lowest rate for the unit load by using the battery charging/discharging information and the power rate information per time slot; and
scheduling an optimized charging/discharging level of the energy storage apparatus based on the solar-generated battery charging amount per time slot, the grid-generated battery charging amount, and the battery discharging amount corresponding to the particular load.

12. The method of claim 11, wherein the scheduling the optimized charging/discharging level of the energy storage apparatus comprises:
applying a variation error of a predetermined range to calculate an optimized solar-generated battery charging amount per time slot, an optimized grid-generated battery charging amount, and an optimized battery discharging level determined based on an initial result of the scheduling.

* * * * *